US010263968B1

(12) United States Patent
Ashminov et al.

(10) Patent No.: US 10,263,968 B1
(45) Date of Patent: Apr. 16, 2019

(54) SECURITY MEASURE FOR EXCHANGING KEYS OVER NETWORKS

(71) Applicant: Hologic Inc., Bedford, MA (US)

(72) Inventors: Constantine Ashminov, Boston, MA (US); Jay Stein, Boston, MA (US)

(73) Assignee: Hologic Inc., Bedford, MA (US)

( * ) Notice: Subject to any disclaimer, the term of this patent is extended or adjusted under 35 U.S.C. 154(b) by 0 days.

(21) Appl. No.: 14/808,709

(22) Filed: Jul. 24, 2015

(51) Int. Cl.
H04L 29/06 (2006.01)
H04L 9/08 (2006.01)
H04L 9/32 (2006.01)

(52) U.S. Cl.
CPC .......... *H04L 63/061* (2013.01); *H04L 9/0819* (2013.01); *H04L 63/0435* (2013.01); *H04L 63/067* (2013.01); *H04L 63/068* (2013.01)

(58) Field of Classification Search
CPC ............. H04L 63/0428; H04L 63/0823; H04L 29/12358; H04L 29/125; H04L 61/25; H04L 61/2564; H04L 63/06; H04L 63/164
See application file for complete search history.

(56) References Cited

U.S. PATENT DOCUMENTS

| 4,815,130 | A  | * | 3/1989  | Lee      | H04L 9/065    |
|           |    |   |         |          | 380/265       |
| 6,567,913 | B1 | * | 5/2003  | Ryan, Jr.| G07B 17/00733 |
|           |    |   |         |          | 380/283       |
| 7,178,033 | B1 | * | 2/2007  | Garcia   | G06F 21/10    |
|           |    |   |         |          | 713/165       |
| 8,015,595 | B2 | * | 9/2011  | Benbrahim| G07F 17/32    |
|           |    |   |         |          | 380/251       |
| 8,024,560 | B1 | * | 9/2011  | Alten    | H04L 63/0823  |
|           |    |   |         |          | 713/156       |
| 8,266,428 | B2 | * | 9/2012  | Kwon     | H04L 29/12358 |
|           |    |   |         |          | 713/153       |
| 8,611,542 | B1 | * | 12/2013 | Ishii    | H04L 63/0428  |
|           |    |   |         |          | 380/277       |
| 8,761,397 | B1 | * | 6/2014  | Wright   | G06F 1/24     |
|           |    |   |         |          | 380/270       |
| 9,084,110 | B2 | * | 7/2015  | Escott   | H04L 63/06    |
| 2003/0108205 | A1 | * | 6/2003 | Joyner   | H04L 9/0618   |
|           |    |   |         |          | 380/277       |
| 2003/0210139 | A1 | * | 11/2003 | Brooks  | B64F 1/368    |
|           |    |   |         |          | 340/531       |
| 2003/0217165 | A1 | * | 11/2003 | Buch    | H04L 29/06027 |
|           |    |   |         |          | 709/229       |

(Continued)

*Primary Examiner* — Gary S Gracia

(57) ABSTRACT

Aspects of the present disclosure relate to systems and methods for exchanging keys within a peer-to-peer network. Exchanging keys within a peer-to-peer network may include generating one or more keys for encrypting and decrypting content that is communicated between one or more client computing devices of a network. The one or more keys may be transmitted over the peer-to-peer network between the one or more client computing devices. A security measure value for each key that has been transmitted may be generated and/or updated based on at least one condition associated with transmitting the one or more keys over the peer-to-peer network. Content may be encrypted and decrypted using one of the one or more keys based on a desired security measure value of the key. All copies of the key used to encrypt and decrypt the content may be deleted such that the content is unrecoverable.

20 Claims, 6 Drawing Sheets

(56) References Cited

U.S. PATENT DOCUMENTS

| | | | | |
|---|---|---|---|---|
| 2005/0154925 A1* | 7/2005 | Chitrapu | H04W 12/04 | 726/19 |
| 2005/0169310 A1* | 8/2005 | Knapp | H04L 63/0428 | 370/470 |
| 2006/0063594 A1* | 3/2006 | Benbrahim | G07F 17/32 | 463/42 |
| 2006/0075221 A1* | 4/2006 | Moore | H04L 63/0823 | 713/156 |
| 2006/0233376 A1* | 10/2006 | Forsberg | H04L 63/04 | 380/277 |
| 2006/0242423 A1* | 10/2006 | Kussmaul | G06F 21/32 | 713/182 |
| 2007/0067402 A1* | 3/2007 | Sugii | H04L 51/30 | 709/206 |
| 2007/0160063 A1* | 7/2007 | Mynam | H04L 63/068 | 370/395.52 |
| 2007/0162746 A1* | 7/2007 | Kwon | H04L 29/12358 | 713/164 |
| 2008/0065884 A1* | 3/2008 | Emeott | H04L 9/0836 | 713/168 |
| 2008/0162924 A1* | 7/2008 | Chinitz | H04L 63/20 | 713/153 |
| 2008/0184031 A1* | 7/2008 | McGough | H04L 63/062 | 713/171 |
| 2008/0307519 A1* | 12/2008 | Curcio | H04L 63/0227 | 726/15 |
| 2009/0060182 A1* | 3/2009 | Killian | H04N 7/163 | 380/201 |
| 2009/0086978 A1* | 4/2009 | McAvoy | G06F 21/10 | 380/279 |
| 2009/0233578 A1* | 9/2009 | Feder | H04L 63/062 | 455/410 |
| 2009/0282251 A1* | 11/2009 | Cook | H04L 63/062 | 713/171 |
| 2010/0106967 A1* | 4/2010 | Johansson | H04L 9/12 | 713/158 |
| 2010/0138660 A1* | 6/2010 | Haynes | H04L 63/061 | 713/171 |
| 2010/0223458 A1* | 9/2010 | McGrew | H04L 9/0833 | 713/153 |
| 2010/0281251 A1* | 11/2010 | Arauz Rosado | H04L 12/4641 | 713/152 |
| 2011/0055558 A1* | 3/2011 | Liu | H04L 9/0637 | 713/160 |
| 2012/0011360 A1* | 1/2012 | Engels | H04L 9/006 | 713/166 |
| 2012/0121089 A1* | 5/2012 | Morioka | H04L 9/0827 | 380/270 |
| 2012/0148044 A1* | 6/2012 | Fang | H04L 63/0428 | 380/255 |
| 2013/0117308 A1* | 5/2013 | Korhonen | H04L 29/12113 | 707/770 |
| 2013/0145147 A1* | 6/2013 | Neau | G06F 21/10 | 713/153 |
| 2013/0246783 A1* | 9/2013 | Ho | H04L 9/0861 | 713/150 |
| 2014/0093082 A1* | 4/2014 | Jung | H04L 63/104 | 380/270 |
| 2014/0126489 A1* | 5/2014 | Zakrzewski | H04W 28/26 | 370/329 |
| 2014/0281508 A1* | 9/2014 | Akhter | H04L 9/0833 | 713/162 |
| 2014/0324923 A1* | 10/2014 | Sugimoto | G06F 17/30312 | 707/812 |

* cited by examiner

SECURITY MEASURE FOR EXCHANGING KEYS OVER NETWORKS

BACKGROUND

Generally electronic data exchange and cryptography over communication networks require the implementation of a client-server infrastructure and/or introduce new messaging protocols. In this regard, existing systems for electronic data exchange and cryptography require the presence of a third party "trusted entity" between two communicating clients. The third party "trusted entity" is typically implemented as a network messaging server. In some cases, management of keys for decrypting and encrypting exchanged data is difficult to implement. As such, existing systems for electronic data exchange and cryptography are complex and/or may be unsuitable for the exchange of confidential and/or proprietary information for which improved control, preferably absolute control, of distribution is desired. It is with respect to this general environment that aspects of the present disclosure have been contemplated.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Aspects of the present disclosure relate to exchanging keys over a peer-to-peer network. Exchanging keys within a peer-to-peer network may facilitate direct key exchanges such that a third party entity is not required for the exchange. In turn, the exchange of confidential and/or proprietary information may be done efficiently and securely using existing infrastructures and protocols and with improved control, preferably absolute control, of the desired distribution. In one case, one or more keys may be generated for encrypting and decrypting content that is communicated between a plurality of client computing devices of a network. A security measure value may be assigned to the plurality of keys before the plurality of keys are transmitted between the plurality of client computing devices over the peer-to-peer network. The security measure value may indicate a level of security associated with transmitting each key over the peer-to-peer network. For example, the level of security may be indicative of the ability of a third party to eavesdrop on the peer-to-peer network and intercept the key during transmission. After the one or more keys are transmitted over the peer-to-peer network, the security measure value for each key that has been transmitted may be updated based on at least one condition associated with transmitting the plurality of keys over the peer-to-peer network. In one case, the security measure value is updated on all the client computing devices within the peer-to-peer network and is updated every time one or more keys get transmitted from one client computing device to another client computing device. The one or more keys may be used to encrypt and decrypt content. A key may be selected to encrypt and decrypt the content based on a desired security level of which the key was transmitted (e.g., whether there was a high or low likelihood of the key being intercepted during transmission). After content is encrypted, transmitted over a network, and decrypted, all copies of the key used to encrypt and decrypt the content may be deleted such that the content is unrecoverable.

These and other features and advantages, which character the present non-limiting embodiments, will be apparent from a reading of the following detailed description and a review of the associated drawings. It is to be understood that both the foregoing general description and the following detailed description are explanatory only and are not restrictive of the non-limiting embodiments as claimed.

In one aspect, the technology relates to a method of exchanging keys within a peer-to-peer network, the method includes: generating a first key, at a first computing device, for encrypting and decrypting content that is communicated between the first computing device and at least a second computing device; assigning a security measure value to the first key; transmitting the first key over the peer-to-peer network to at least the second computing device; updating the security measure value of the first key based on at least one condition associated with transmitting the first key over the peer-to-peer network; generating encrypted content using the first key based at least upon a desired security measure value of the first key; and sending the encrypted content over a network to a second computing device. In an embodiment, the first key is used to decrypt the encrypted content at the second device. In another embodiment, the first key is deleted when the content is accessed at the at least second computing device. In yet another embodiment, the first key is deleted upon the expiration of a period of time. In still another embodiment, at least one condition associated with transmitting the one or more keys over the peer-to-peer network includes at least one of: a type of network over which the one or more keys are transmitted; a type of method used to transmit the one or more keys; a type of computing device that generated the one or more keys; and a time stamp associated with the one or more keys.

In another embodiment of the above aspect, a maximum value for the desired security measure value indicates a highest level of security. In an embodiment, a minimum value for the desired security measure value indicates a lowest level of security. In another embodiment, the first key includes an infinite stream of bits. In yet another embodiment, the method includes: transmitting a second key over the peer-to-peer network to at least a third computing device; and updating the security measure value of the second key based on at least one condition associated with transmitting the second key over the peer-to-peer network.

In another aspect, the technology relates to a computer storage medium encoding computer executable instructions that, when executed by at least one processor, perform a method for exchanging keys within a peer-to-peer network, the method including: generating a first key, at a first computing device, for encrypting and decrypting content that is communicated between the first computing device and at least a second computing device; assigning a security measure value to the first key; transmitting the first key over the peer-to-peer network to at least the second computing device; and updating the security measure value of the first key based on at least one condition associated with transmitting the first key over the peer-to-peer network. In an embodiment, the method further includes generating encrypted content using the first key based on a desired security measure value of the first key. In another embodiment, the method further includes sending the encrypted content over a network to at least the second computing device. In yet another embodiment, the method further includes deleting the first key from the first computing device. In still another embodiment, the first key is used to decrypt the encrypted content at the second device.

In another embodiment of the above aspect, the at least one condition associated with transmitting the one or more keys over the peer-to-peer network includes at least one of: a type of network over which the one or more keys is transmitted; a type of computing device that generated the one or more keys; and a time stamp associated with the first key. In an embodiment, the method further includes: transmitting a second key of the one or more keys over the peer-to-peer network to at least a third computing device; and updating the security measure value of the second key based on the at least one condition associated with transmitting the second key over the peer-to-peer network. In another embodiment, a maximum value for the security measure value indicates a highest level of security, and wherein a minimum value for the security measure value indicates a lowest level of security.

In another aspect, the technology relates to a system having: at least one processor; and memory encoding computer executable instructions that, when executed by the at least one processor, perform a method for exchanging keys within a peer-to-peer network, the method including: generating at one or more keys, at a first computing device, for encrypting and decrypting content that is communicated between the first computing device and at least a second computing device; assigning a security measure value to the one or more keys; transmitting the one or more keys over the peer-to-peer network to at least the second computing device; updating the security measure value of the at one or more keys based on at least one condition associated with transmitting the one or more keys over the peer-to-peer network; generating encrypted content using a first key of the one or more keys based on a desired security measure value of the first key; sending the encrypted content over a network to at least the second computing device; deleting the first key of the one or more keys from the first computing device. In an embodiment the first key is deleted from the second computing device when the content is accessed at the at least second computing device. In another embodiment, the first key is deleted from the second computing device when a period of time has expired.

BRIEF DESCRIPTION OF THE DRAWINGS

The same number represents the same element or same type of element in all drawings.

DETAILED DESCRIPTION

Aspects of the present disclosure relate to systems and methods for exchanging keys within a peer-to-peer network. In this regard, the systems and methods for exchanging keys within a peer-to-peer network may include an operating environment and network infrastructure for generating one or more keys for encrypting and decrypting content that is communicated between one or more client computing devices of a network. A security measure value may be associated with an individual key and/or a group of keys of the one or more keys before the one or more keys are transmitted between the one or more client computing devices over the peer-to-peer network. After the one or more keys are transmitted over the peer-to-peer network, the security measure value for each key that has been transmitted may be updated based on at least one condition associated with transmitting the one or more keys over the peer-to-peer network. For example, the security measure value may change depending on how a key is transmitted (e.g., over a wireless network, via direct connection, etc.). Content may be encrypted and decrypted using one of the one or more keys based on a desired security measure value of the key. All copies of the key used to encrypt and decrypt the content may be deleted such that the content is unrecoverable.

Exchanging keys within a peer-to-peer network may facilitate direct key exchanges such that a third party entity is not required for the exchange. In turn, the exchange of confidential and/or proprietary information may be done efficiently and securely using existing infrastructures and protocols and with improved control, preferably absolute control, of the desired distribution. While specific methods for exchanging keys within a peer-to-peer network are described, one of skill in the art will appreciate that any type of key exchanging method may be employed without departing from the scope of this disclosure.

Figure 1A:
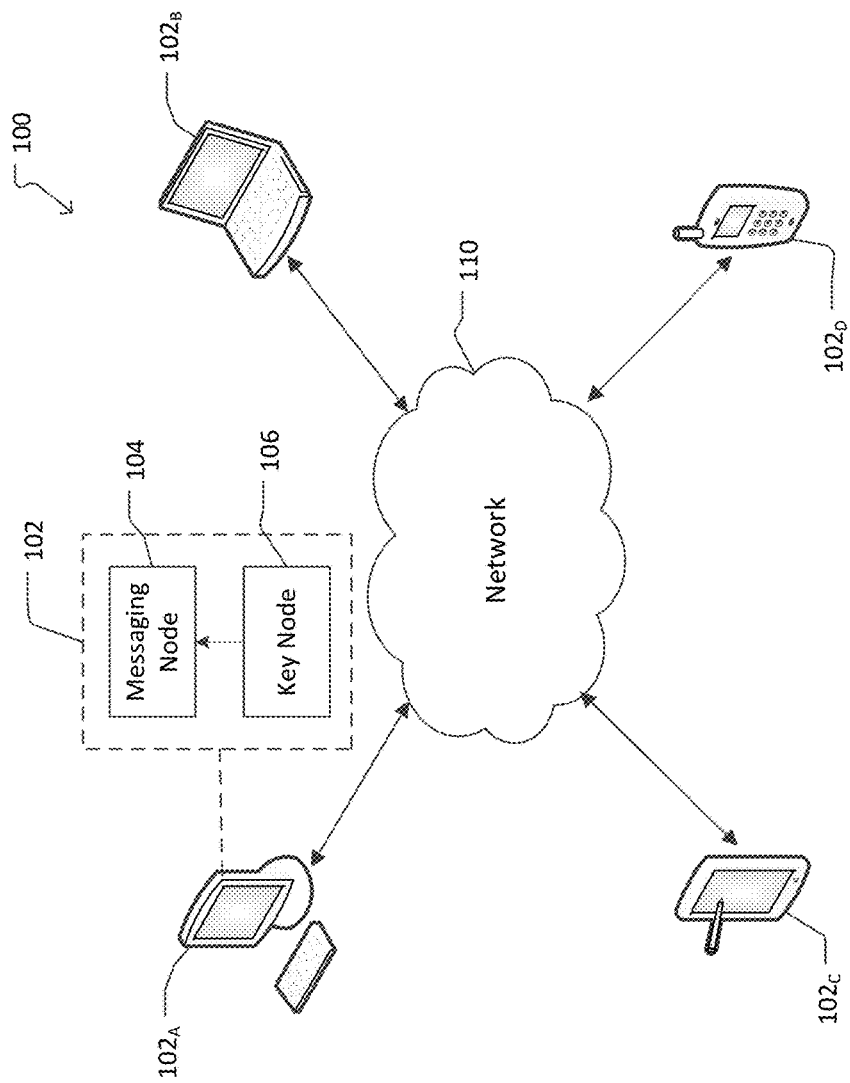
FIG. 1A illustrates an exemplary operating environment for exchanging keys over a peer-to-peer network according to one or more embodiments of the present disclosure.

FIG. 1A illustrates an exemplary operating environment 100 for exchanging keys within a peer-to-peer network according to one or more embodiments of the present disclosure. In some aspects, the operating environment 100 may include a plurality of client computing devices 102A-102D connected via a peer-to-peer network 110. The client computing devices 102A-102D are exemplary computing devices of client computing device 102. It is appreciated that while FIG. 1A illustrates client computing devices 102A-102D connected via the peer-to-peer network 110, the discussion of client computing device 102 and client computing devices 102A-102D is exemplary only and should not be considered as limiting. Any suitable number of client computing devices 102 may be connected via the peer-to-peer network 110. Furthermore, while the present disclosure discusses the peer-to-peer network 110, this is only exemplary and should not be considered limiting. Any number of peer-to-peer devices and/or networks may be utilized in conjunction with the present disclosure.

The client computing device 102 may be any suitable computing device for generating and/or exchanging keys within a peer-to-peer network. For example, client computing devices 102A-102D include, but are not limited to, personal computers (e.g., 102A), laptop computers (e.g., 102B), tablet computing devices (e.g., 102C), and/or smartphones (e.g., 102D). In some cases, the client computing device 102 may additionally include at least one of a smart watch, a wearable computer, a desktop computer, etc. This list is exemplary only and should not be considered as limiting. Any suitable computing device for generating and/or exchanging keys within a peer-to-peer network may be utilized.

Figure 1B:
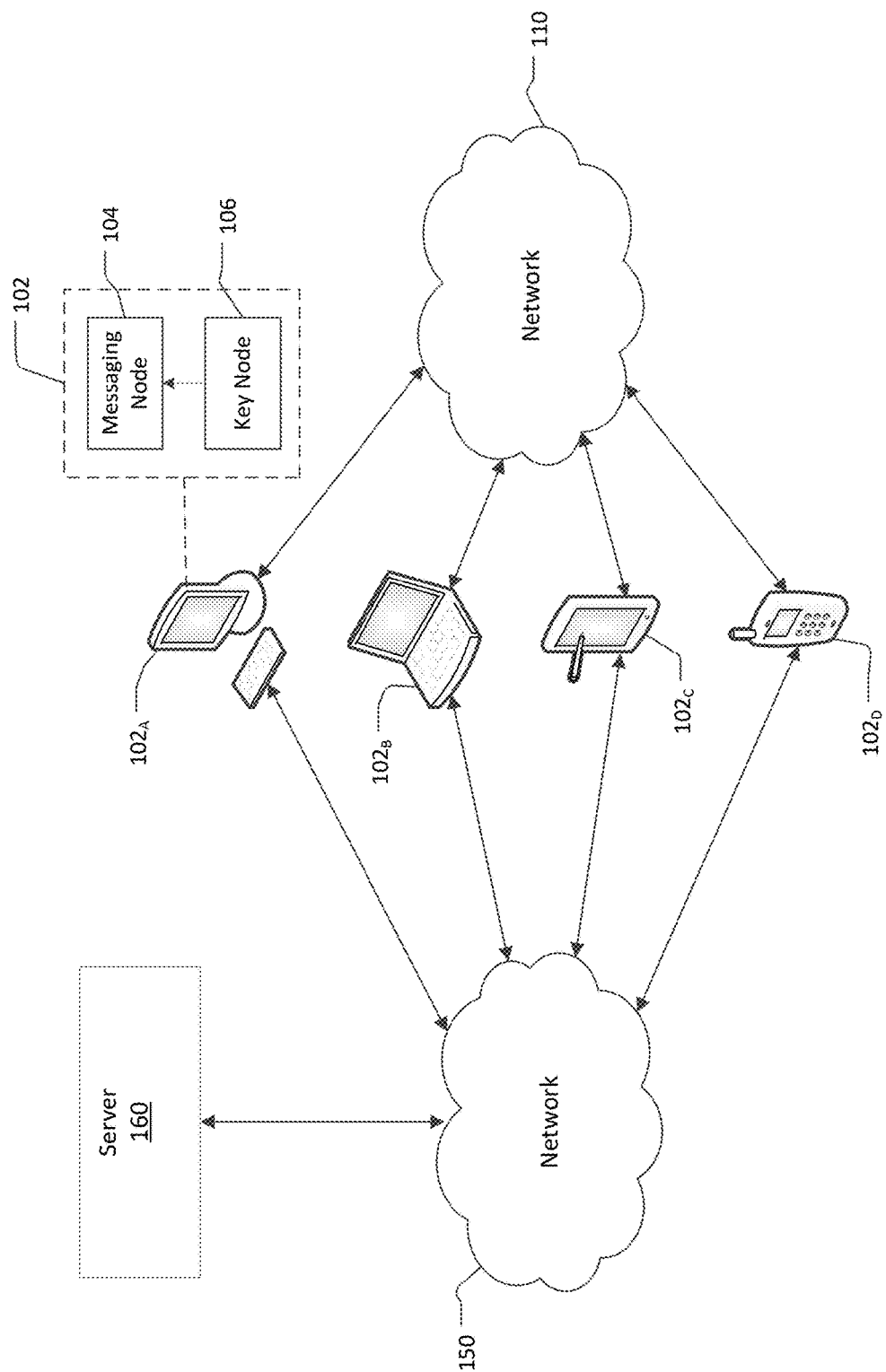
FIG. 1B illustrates an exemplary network for transmitting content between client computing devices according to one or more embodiments of the present disclosure.

In one aspect, the client computing device 102 (e.g., client computing devices 102A-102D) may include a messaging node 104 and a key node 106. The messaging node 104 may be configured to manage the encryption and decryption of content that is communicated over a network. In one example, the content may be communicated within the peer-to-peer network 110. In another example, and with reference now to FIG. 1B, the content may be communicated over any network suitable to transmit content. As shown in FIG. 1B, client computing devices 102A-102D may exchange keys over a first network, such as peer-to-peer network 110; however, content may be transmitted over a second, separate network. For example, computing devices 102A-102D may also be connected via the network 150. In one case, the client computing devices 102A-102D may transmit content to one another over the network 150 via an external server such as a server 160. In some embodiments, the network 150 is a computer network such as the Internet. In this regard, the network 150 may include a Local Area Network (LAN), a Wide Area Network (WAN), wireless and wired transmission mediums. In some embodiments, the server 160 may be an email server and/or mail server.

In one example, the messaging node 104 may be a plug-in to an existing email client over established messaging protocols such as POP3, IMAP, SMTP, and the like. In this regard, the content that is communicated over the network 150 may include email messages. In other examples, the content may include any electronic files such as text, video, pictures, music, documents, and the like. The key node 106 may be configured to generate, delete, store, and/or exchange keys for encryption and decryption of the content. In one example, the key node 106 may enforce the validity of the keys and/or the lifespan of the keys. In embodiments, a key may be valid when at least the following conditions have been met: the key has not been used for decryption of content and the lifespan (e.g., a time period) of the key has not expired. In one case, the keys may additionally include an identifier for establishing the validity of the key. One skilled in the art will appreciate that other conditions for validity may be employed without departing from the scope of the disclosure.

In another example, the key node 106 may implement an interface to deliver the keys to the messaging node 104 for encryption and/or decryption of the content. The keys for encryption and decryption of content may be cryptographically structured and include One-Time pad (OTP) encryption. For example, content that is communicated over the network 150 has its own set of credentials (e.g., its own associated key) such that each key may be used a single time and once the content has been decrypted or the lifespan of the key has expired, the content is unrecoverable. In one example, if the lifespan of the key expires while the content is open, the content is deleted and becomes unrecoverable. In another example, if the lifespan of the key expires while the content is open, the content is deleted after it has been closed. That is, the content cannot be accessed/decrypted a second time.

As discussed above, the operating environment 100 may include a plurality of client computing devices 102A-102D connected via the peer-to-peer network 110. In some aspects, the peer-to-peer network 110 may be any network with two or more client computing devices 102 connected with one another without a third party entity for key exchange. In this regard, the client computing devices 102A-102D may communicate with one another over a direct connection. In one case, the direct connection is a point-to-point connection between two client computing devices 102. For example, the key node 106 of the client computing device 102A may establish a direct connection with the key node 106 of the client computing device 102B. In other cases, the client computing devices 102A-102D may communicate with one another over a Local Area Network (LAN) or a Wide Area Network (WAN). In some cases, the peer-to-peer network 110 may be wired network (e.g., a point-to-point network). For example, two or more client computing devices 102 may be connected via a cable (e.g., an Ethernet cable, USB cable, etc.). In some cases, the peer-to-peer network 110 may be a wireless network. For example, two or more client computing devices 102 may be connected via Wi-Fi and/or Bluetooth. In still other embodiments, the peer-to-peer network 110 may be a combination of different types of networks.

As discussed above, the key node 106 may be configured to generate, delete, store, and exchange keys for encryption and decryption of the content that are communicated between any of the client computing devices 102A-102D within the peer-to-peer network 110. In this regard, the key node 106 may generate one or more keys for encrypting and decrypting content that are communicated between any of the computing devices 102A-102D within the peer-to-peer network 110. In one case, the generated keys may be generated using an infinite stream of bits. For example, any number of sequential bits starting at a first location in the infinite stream of bits may be used to encrypt content. Each key node 106 of each of the client computing devices 102A-102D within the peer-to-peer network 110 may generate one or more keys. The one or more generated keys of each client computing device 102A-102D may be generated at similar or different rates and at similar or different times. For example, client computing device 102A may generate three keys at a first time and client computing device 102B may generate five keys at the first time. In another example, client computing device 102A may generate three keys at a first time and client computing device 102B may generate zero keys at the first time, but may generate five keys at a second time.

When keys are generated, a security measure value may be assigned to each key that gets generated. The security measure value may indicate a level of security associated with transmitting each key over the peer-to-peer network 110. For example, the level of security may be indicative of the ability of a third party to eavesdrop on the peer-to-peer network and intercept the key during transmission. In this regard, a higher security measure value may indicate that there is a lower likelihood that a third party could have intercepted the key during transmission. Similarly, a lower security measure value may indicate that there is a higher likelihood that a third party could have intercepted the key during transmission. An initial security measure value may be assigned to each key that gets generated. In one example, the initial security measure value is a maximum value. The maximum security measure value may indicate a highest level of security (e.g., the most secure transmission of a key). In another example, a security measure value may be assigned to each key after the key has been transmitted over the peer-to-peer network 110 (e.g., the initial security measure value may be updated). The updated security measure value may be based on how the key was transmitted (e.g., the likelihood of an eavesdropper intercepting the key during transmission), which will be discussed in detail below.

As discussed above, the keys may be exchanged within the peer-to-peer network 110. In this regard, after the one or more keys get generated and get assigned a security measure value, the one or more keys may be transmitted from the key node 106 of the client computing device 102 that generated the one or more keys to at least one other client computing device 102 (e.g., one of client computing devices 102B-102D) within the peer-to-peer network 110. In one case, the one or more keys may be transmitted to all the client computing devices 102 within the peer-to-peer network 110. As such, the one or more keys that get transmitted may be located on every client computing device 102 within the peer-to-peer network 110 including the client computing device 102 that generated and transmitted the one or more keys. In one aspect, the key node 106 of each client computing device 102 may transmit the one or more generated keys in at least two modes of operation. The first mode of operation may include transmitting only the keys that have been generated by the client computing device 102. The second mode operation may include transmitting all the keys in the possession of the client computing device 102. For example, each client computing device 102 may transmit the keys of one or more other client computing devices 102. In one case, the key node 106 may only initiate and transmit one or more keys only if there is negligible risk for third party (e.g., unauthorized) eavesdropping. In one embodiment, the messaging node 104 and the key node 106 may be located on different computing devices. As such, the messaging node 104 and the key node 106 may be in operative communication with one another.

Figure 2:
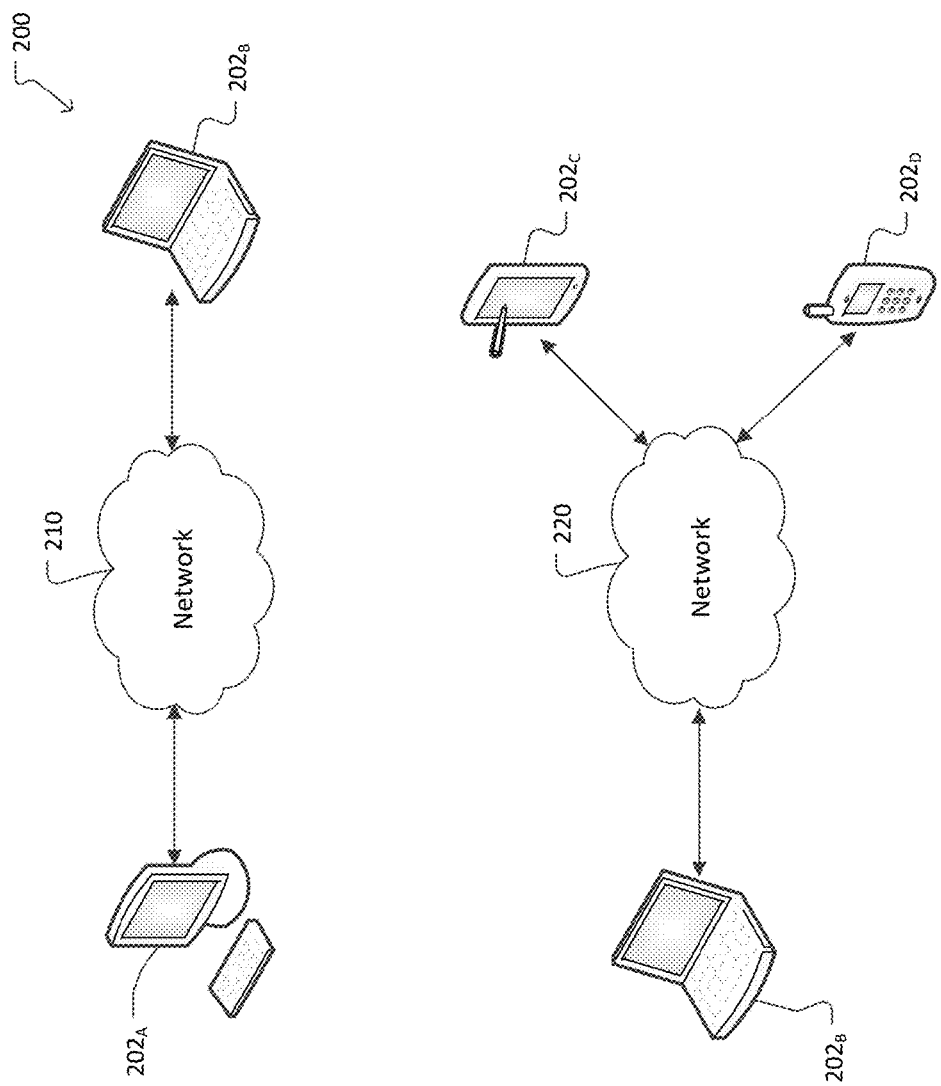
FIG. 2 illustrates an exemplary operating environment for exchanging keys over one or more peer-to-peer networks in at least two modes of operation according to one or more embodiments of the present disclosure.

FIG. 2 illustrates an exemplary operating environment 200 for exchanging keys over one or more peer-to-peer networks in at least two modes of operation according to one or more embodiments of the present disclosure. The operating environment 200 may include a first peer-to-peer network 210, a second peer-to-peer network 220, and client computing devices 202A-202D. The operating environment 200, first peer-to-peer network 210, second peer-to-peer network 220, and the client computing devices 202A-202D may be configured similar to the operating environment 100, the peer-to-peer network 110, and the client computing devices 102A-102D described above relative to FIG. 1A. In this regard, the operating environment 200 may include all the functionality described in the above embodiments and/or aspects relative to the operating environment 100 of FIG. 1A.

As such, the client computing device 202A may generate one or more keys for transmission to the client computing device 202B over the peer-to-peer network 210. In one example, the one or more keys may be transmitted via the first mode of operation described above relative to FIG. 1A. That is, only the keys that have been generated by the client computing device 202A may be transmitted to the client computing device 202B upon establishing a direct connection with the client computing device 202B. In this example, the client computing device 202B may have the one or more keys received from the client computing device 202A and one or more keys that the client computing device 202B generated.

In another example, the client computing device 202B may establish a direct connection with both the client computing device 202C and the client computing device 202D over the peer-to-peer network 220. In one case, the client computing device 202B may have one or more keys that were generated by the client computing device 202B and the one or more keys that were received from the client computing device 202A. In this regard, the client computing device 202B may transmit its one or more keys via the first mode of operation or the second mode of operation. In the first mode of operation, only the keys that have been generated by the client computing device 202B may be transmitted to the client computing device 202C and the client computing device 202D. In the second mode of operation, all the keys stored at the client computing device 202B may be transmitted to the client computing device 202C and the client computing device 202D. That is, the one or more keys that were generated by the client computing device 202B and the one or more keys that were received from the client computing device 202A may be transmitted to the client computing device 202C and the client computing device 202D.

As discussed above, a security measure value may be assigned to each key of the one or more generated keys. Referring back to FIG. 1A, after the one or more keys are transmitted to all of the client computing devices 102 within the peer-to-peer network 110, the security measure values for each key of the one or more transmitted keys may be updated. In this regard, when one or more keys are transmitted within the peer-to-peer network 110, information associated with the one or more keys may be transmitted as well. In one example, the information may include an identifier for the client computing device 102 that transmitted the one or more keys (e.g., the sending client computing device 102), an identifier for the key itself, a time stamp of the generation of the key, and the security measure value of the key. The client computing device 102 that receives the one or more transmitted keys (e.g., the recipient client computing device 102) may update the security measure value of the one or more keys. In this regard, the updated security measure value for the one or more keys may be transmitted to all the client computing devices 102 within the peer-to-peer network 110 that received the one or more keys. As such, each client computing device 102 has the latest security measure value of each key in its possession.

In some aspects, the security measure value of each key of the one or more keys is updated based on at least one condition associated with transmitting the one or more keys over the peer-to-peer network 110. The at least one condition associated with transmitting the one or more keys over the peer-to-peer network 110 may include at least one of the type of network over which the one or more keys is transmitted, how the one or more keys is transmitted, the type of client computing device that generated the one or more keys, and a time stamp associated with the one or more keys.

In one case, the type of network over which the one or more keys is transmitted may include a point-to-point network, a LAN network, a WAN network, a wired network, a wireless network, and the like. For example, when a key is transmitted over a point-to-point network (e.g., a direct connection exists) and the network is wired, the security measure value may be a maximum value indicating a highest level of security. In another example, when a key is transmitted over a point-to-point network and the network is wireless (e.g., Bluetooth), the security measure value may be a maximum value if no other computing devices are in the range of transmission of the Bluetooth. However, if other devices are in the range of transmission of the Bluetooth (e.g., there is a possibility of another computing device intercepting/eavesdropping the key during transmission) the security measure value may be between a maximum value and a minimum value. In yet another example, when a key is transmitted over a LAN or a WAN, the security measure value may be a minimum value. In one case, the minimum security measure value may indicate a lowest level of security (e.g., the least secure transmission of a key). The security measure value associated with the type of network over which the key is transmitted is based on the ease and/or difficulty of a third party intercepting the key during transmission over the network. As such, a direct connection may have a maximum security measure value because the likelihood of a third party having the capability to intercept the key during transmission over a direct connection is low. In contrast, a WAN or LAN network may have a minimum security measure value because the likelihood of a third party having the capability to intercept the key during transmission over a WAN or LAN network is high.

In some cases, the one or more keys may be transmitted with or without additional encryption. For example, a key may be transmitted via a digital envelope. In this regard, the key may be encrypted before it gets transmitted to a client computing device 102. As such, when a key is transmitted via a digital envelope, the security measure value may be a higher value than when a key is transmitted without any encryption. In one aspect, the type of client computing device 102 that generated the one or more keys may refer to whether the client computing device 102 is an office PC and/or office laptop (e.g., a PC and/or laptop connected to an office network), a mobile device, a tablet, and the like. As such, when the client computing device 102 is an office PC connected to an office network, the security measure value may be a lower value. A key transmitted from an office PC may be assigned a lower security measure value because it is likely the office PC will transmit the key via an office network.

In one case, the time stamp associated with the one or more keys may include the time at which the key was generated. For example, the more time that has elapsed from the time of generation of the key to the time of transmission of the key, the lower the security measure value will be. As such, if a key is generated one-month before it gets transmitted to a client computing device 102, the security measure value may be a lower value than if the key is generated one-day before it gets transmitted to a client computing device 102. In another example, the security measure value may be based on how much time has elapsed since the key was generated (e.g., how the key has been stored since it was generated). In yet another example, the security measure value may be based on the time that has elapsed since the key was transmitted.

In one aspect, as discussed above, the security measure value of the one or more keys may be updated based on at least one condition associated with transmitting the one or more keys over the peer-to-peer network 110. In this regard, the security measure value of the one or more keys may be updated based on any combination of the conditions associated with transmitting the one or more keys over the peer-to-peer network 110, as described above. For example, a key that is transmitted over a wired point-to-point network via a digital envelope and that is generated one-day before it gets transmitted may be assigned a higher security measure value. In another example, a key that is transmitted over a wireless peer-to-peer network that is not encrypted and that is generated one-week before it gets transmitted may be assigned a mid-level security measure value.

As discussed above, the client computing device 102 that receives the key, updates the security measure value of the key based upon the conditions of which the key was transmitted. Furthermore, the client computing device 102 sends the updated security measure value to all the client computing devices 102 within the peer-to-peer network 110 such that the security measure value is updated for its corresponding key on all the client computing devices 102 within the peer-to-peer network. In this regard, each time a key gets transmitted within the peer-to-peer network 110, the security measure value of the key is updated based upon the conditions associated with transmitting the key over the peer-to-peer network 110. When the security measure value of the key is updated, the security measure value gets updated on all the client computing devices 102 that have the key. For example, the client computing device 102 that updates the security measure value may send the updated security measure value to all the client computing devices 102 within the peer-to-peer network 110 that the client computing device 102 is connected to. In this regard, content may be encrypted based on the security measure value of each key of the one or more generated and transmitted keys. For example, before content is encrypted and communicated between client computing devices 102A-102D, the messaging node 104 may query the key node 106 for keys that are available for encrypting the content.

In one aspect, the keys that are available for encrypting the content include the keys and their associated security measure values that are located at the recipient client computing device 102. For example, if a user of the client computing device 102A desires to send content to the client computing device 102B (e.g., the recipient client computing device), the messaging node 104 at the client computing device 102A may query the key node 106 at the client computing device 102A to determine which keys are available at the client computing device 102B. In this regard, the key node 106 may provide the messaging node 104 with a list of the keys and their associated security measure values located at the client computing device 102B. As such, the security level desired for transmitting the content may be associated with the security measure value of the key for encrypting the content. For example, if a user wants to transmit highly confidential content, the user may want to select a key with the maximum security measure value for encrypting the content. In this way, it is likely that the key was not intercepted (e.g., there was no eavesdropping) during transmission and only the recipient client computing device 102 can decrypt the content.

In one case, if the security level desired for transmission of the content is unavailable (e.g., a key with the desired security measure value is not available on the recipient client computing device 102), the communication of the content may be aborted and/or postponed until a key with the desired security measure value becomes available at the recipient client computing device 102. In one case, an interface of the sending client computing device 102 may include a drop down menu, for example, that includes a selection for the recipient client computing device 102 and all the keys and their associated security measure values available at the recipient client computing device 102. In this regard, a user may choose the security level desired for sending content to the recipient client computing device 102 from the available security measure values of the keys. Upon choosing content, a recipient of the content and a desired security level for transmission of the content, the messaging node 104 may encrypt the content using the selected key. In one case, the content may be encrypted using established methods of public/private key cryptography. In an embodiment, the content may be encrypted in response to the sending client computing device 102 initiating transmission of the content, e.g., upon a keystroke of the user and/or any other action taken by the user. Alternatively, the content may be encrypted at any point prior to the point of transmission of the content, e.g., at any point after the content is available or created, by the user, the messaging node, and/or any other component of the client computing device.

Once the content is encrypted, it may be sent over the peer-to-peer network 110 or the network 150 to the recipient client computing device 102. When the content is sent to the recipient client computing device 102, the key used to encrypt the content may be deleted from the sending client computing device 102 by the key node 106. When the content is received at the recipient client computing device 102, the content may be decrypted using the same key that was used to encrypt the content. In one case, when the content is decrypted and accessed by a user of the recipient client computing device 102, all instances of the key used to decrypt the content are deleted. For example, the key may be deleted from the recipient client computing device 102 and any other client computing devices 102 that had received the key during transmission over the peer-to-peer network 110. In another case, the content may be received by the recipient client computing device 102 and not accessed for a period of time. In this case, the key is not used for decryption until the content is accessed. As such, the key may be deleted when the lifespan of the key has expired. Accordingly, the key at the recipient client computing device 102 associated with the encryption of the content may be deleted when the content gets decrypted (e.g., when the content is accessed) or when the lifespan of the key has expired.

In one case, when the content is accessed, the key may be deleted after a period of time of accessing the content. In another case, when the content is accessed, the key may be deleted when a user manually deletes the content after accessing the content. Alternatively, the key may be deleted based upon satisfaction of one or more conditions (e.g., the content was opened, the content was printed, or any other condition selected by a user). Any type of condition may trigger deletion of a key. In embodiments, the condition may be defined by a user sending the content. In other embodiments, the condition may be based on content type, key type, etc. As discussed above, when the instances of the key get deleted, the content becomes unrecoverable. In this regard, deleting all instances of the key used to encrypt and decrypt the content after the content has been accessed or after the lifespan of the key has expired facilitates the secure exchange of content. In embodiments, once a key is deleted, a notification or instruction may be sent to all other client computing devices that have the key and/or other client computing devices in the peer-to-peer network 110 to delete their copy of the key.

While specific components are illustrated in the exemplary operating environments 100 and 200, one of skill in the art will appreciate that other systems may include additional or fewer components and that the exemplary operating environments 100 and 200 are provided for illustrative purposes. As such, the aspects disclosed herein may be practiced with different systems and/or operating environments without departing from the spirit or scope of this disclosure.

Figure 3:
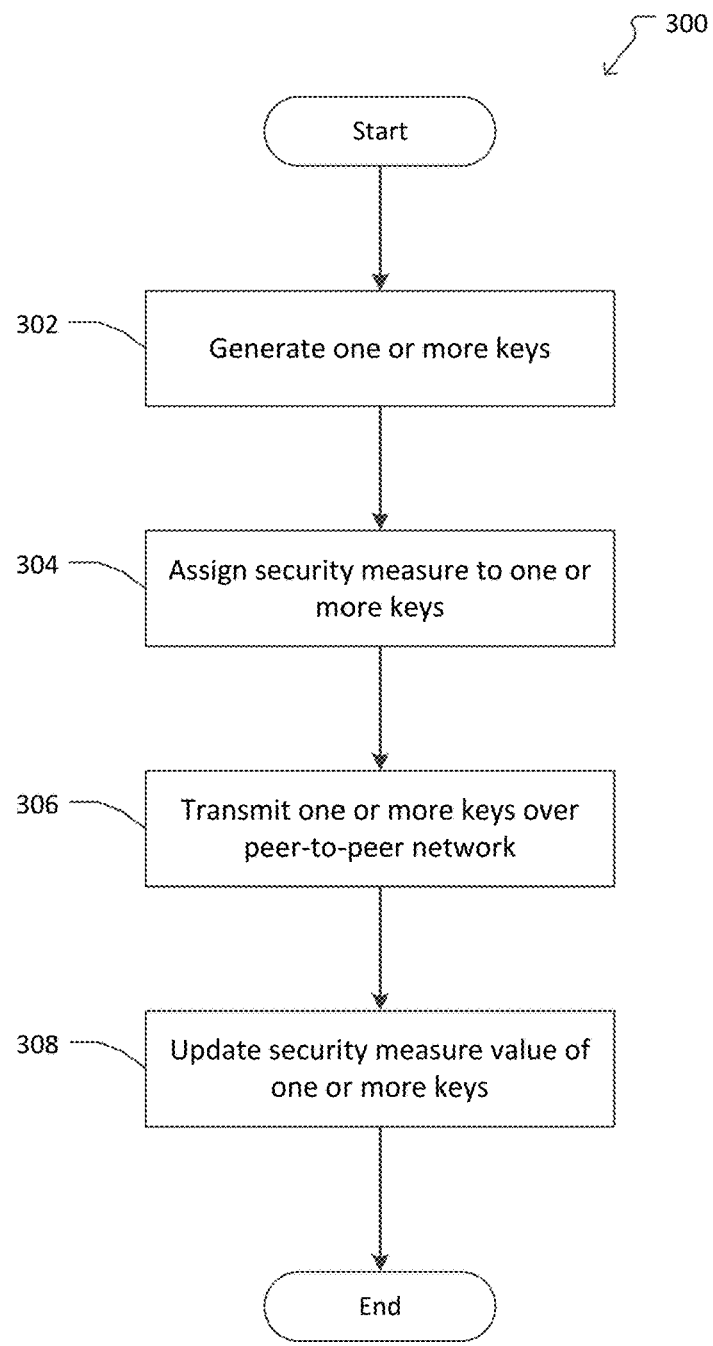
FIG. 3 illustrates an exemplary method for exchanging keys within a peer-to-peer network according to one or more embodiments of the present disclosure.

FIG. 3 illustrates an exemplary method 300 for exchanging keys within a peer-to-peer network according to one or more embodiments of the present disclosure. The method 300 may be performed by a security measure system, such as operating environments 100 and 200, an operating system, or any other type or security measure related application. Additionally, the method 300 may be implemented in software (e.g., though execution of computer-executable instructions by a processor), implemented in hardware, or implemented as a combination of hardware and software. Flow begins at operation 302 where one or more keys are generated. For example, a key node of a client computing device may generate one or more keys for encrypting and decrypting content that are communicated between client computing devices over a network. In one case, the generated keys may be generated using an infinite stream of bits. In one example, any number of sequential bits starting at a first location in the infinite stream of bits may be used to encrypt content. In embodiments, the keys may be generated and/or exchanged using an OTP protocol.

Upon generating one or more keys, flow proceeds to operation 304 where a security measure value may be assigned to the one or more keys. The security measure value may indicate a level of security associated with transmitting the one or more keys over the peer-to-peer network. In embodiments, an initial security measure value may be assigned to each key that gets generated. In one example, the initial security measure value may be a maximum value. The maximum security measure value may indicate a highest level of security (e.g., the most secure transmission of a key).

After assigning a security measure value to the one or more generated keys, flow proceeds to operation 306 where the one or more keys are transmitted over the peer-to-peer network. For example, in one case, the one or more keys may be transmitted to all the client computing devices within the peer-to-peer network. As such, the one or more keys that get transmitted may be located on every client computing device within the peer-to-peer network including the client computing device that generated and transmitted the one or more keys. In one aspect, the key node of each client computing device may transmit the one or more generated keys in at least two modes of operation. The first mode of operation may include transmitting only the keys that have been generated by the client computing device. The second mode operation may include transmitting all the keys in the possession of the client computing device. For example, each client computing device may transmit the keys of one or more other client computing devices.

When the one or more keys get transmitted over the peer-to-peer network, flow proceeds to operation 308 where the assigned security measure value of the one or more keys gets updated. In this regard, when one or more keys are transmitted within the peer-to-peer network, information associated with the one or more keys may be transmitted as well. In one example, the information may include an identifier for the client computing device that transmitted the one or more keys, an identifier for the key itself, a time stamp of the generation of the key, and the security measure value of the key. The client computing device that receives the one or more transmitted keys may update the security measure value of the one or more keys. In this regard, the updated security measure value for the one or more keys may be transmitted to all the client computing devices within the peer-to-peer network that received the one or more keys. As such, each client computing device has the latest security measure value of each key in its possession.

In some aspects, the security measure value of each key of the one or more keys may be updated based on at least one condition associated with transmitting the one or more keys over the peer-to-peer network. The at least one condition associated with transmitting the one or more keys over the peer-to-peer network may include at least one of the type of network over which the one or more keys is transmitted, how the one or more keys is transmitted, the type of client computing device that generated the one or more keys, and a time stamp associated with the one or more keys. Alternatively, instead of updating the security measure value of each key of the one or more keys, the security measure value may be generated for each key of the one or more keys. For example, when the one or more keys get transmitted over the peer-to-peer network, a security measure value may be generated for the one or more keys based on at least one condition associated with transmitting the one or more keys over the peer-to-peer network.

In some embodiments, a determination of whether to update the security measure value may be made. For example, as discussed above relative to FIG. 2, a key may be transmitted over a first peer-to-peer network 110 and later transmitted over at least a second peer-to-peer network 110. In embodiments, a key may be transmitted over a plurality of peer-to-peer networks 110. The at least one condition associated with transmitting a key over a first peer-to-peer network 110 may be different than the at least one condition associated with transmitting the key over a second peer-to-peer network 110. As such, instead of updating the security measure value of the key based on the conditions associated with the latest transmission of the key, the value of the security measure may be determined by reviewing the conditions associated with each prior transmission of the key. In one embodiment, the security measure value assigned to a key may be based on the least secure transmission of the key. In other embodiments, the determination of what security measure value to assign to the key may be based on various factors including the conditions associated with transmitting the key, the number of peer-to-peer networks 110 over which the key has been transmitted, the number of client computing devices 102 within each peer-to-peer network 110, etc.

Figure 4:
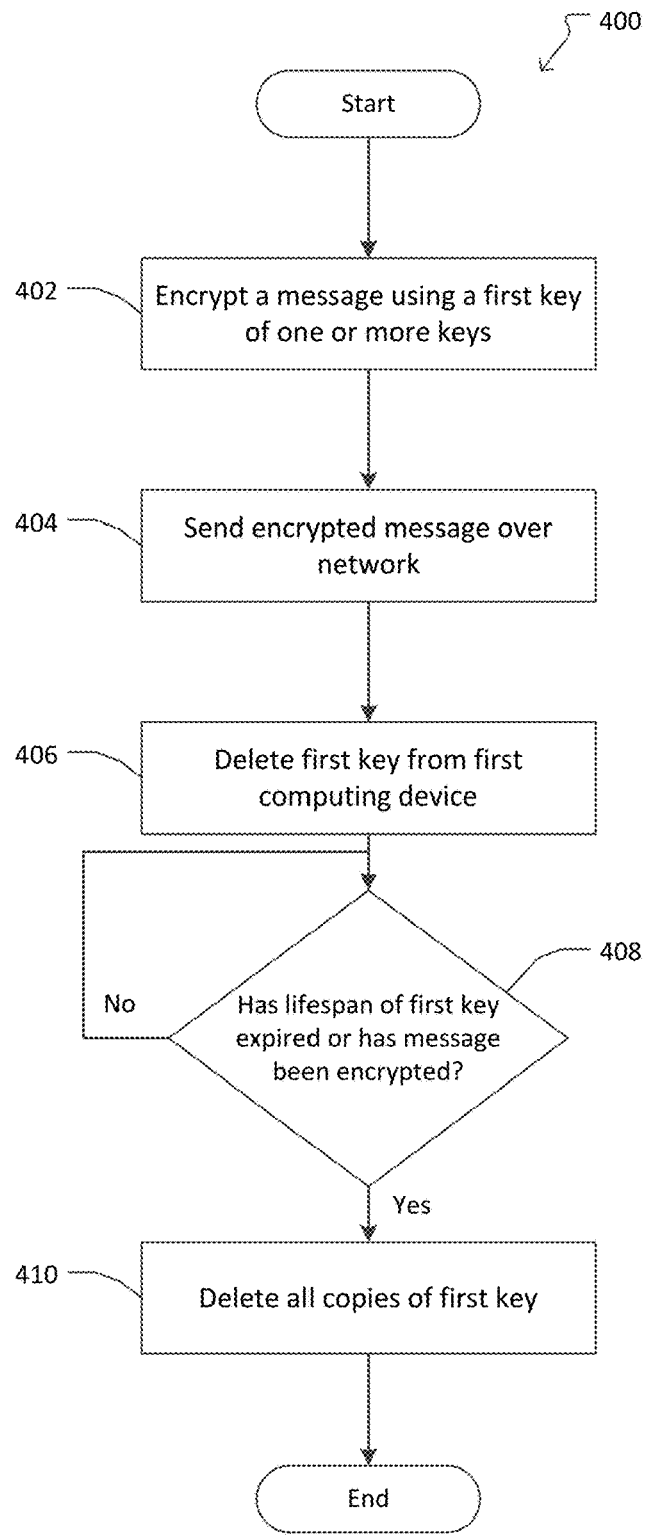
FIG. 4 illustrates an exemplary method for exchanging content within the network illustrated in FIG. 1B using a security measure according to one or more embodiments of the present disclosure.

FIG. 4 illustrates an exemplary method 400 for exchanging content over a network using a security measure according to one or more embodiments of the present disclosure. The method 400 may be performed by a security measure system, such as operating environments 100 and 200, an operating system, or any other type or security measure related application. Additionally, the method 400 may be implemented in software (e.g., though execution of computer-executable instructions by a processor), implemented in hardware, or implemented as a combination of hardware and software. Flow begins at operation 402 where a content is encrypted using a first key of one or more keys. For example, one or more keys may be generated at a sending client computing device for encrypting and decrypting content communicated over a network. Content may be encrypted based on a security measure value of the one or more generated keys. For example, before content is encrypted and communicated over the network, a messaging node may query a key node for keys that are available for encrypting the content. In one case, the content may be encrypted using established methods of public/private key cryptography. In an embodiment, the content may be encrypted in response to the sending client computing device 102 initiating transmission of the content, e.g., upon a keystroke of the user and/or any other action taken by the user. Alternatively, the content may be encrypted at any point prior to the point of transmission of the content, e.g., at any point after the content is available or created, by the user, the messaging node, and/or any other component of the client computing device.

Once the content is encrypted, flow proceeds to operation 404 where the encrypted content may be sent over the network. For example, a user of the sending client computing device may choose a recipient client computing device to which the content is desired to be sent. In one case, the available recipient client computing devices may be the client computing devices that have the first key such that the content can be decrypted. When the content is sent to the recipient client computing device, flow proceeds to operation 406 where the first key is deleted from the sending client computing device. For example, the key node at the recipient client computing device may delete the first key such that the first key is only used one time. In some embodiments, the key may be deleted from the sending device upon satisfaction of a condition.

When the content is received at the recipient client computing device, flow proceeds to operation 408 where it is determined whether a condition has been satisfied. In one case, the condition may include whether the lifespan of the first key has expired. In another case, the condition may include whether the content has been decrypted. The lifespan of the first key may be a predetermined time period associated with the first key that indicates when the key is no longer valid. For example, when the predetermined time period expires, the key is no longer valid and cannot be used for decryption. The content may be decrypted when the content is accessed (e.g., opened, printed, etc.).

If the condition has been satisfied (e.g., if the lifespan of the first key has expired or the content has been decrypted) flow branches YES to operation 410 where all copies of the first key are deleted. For example, the first key may be deleted from the recipient client computing device and any other client computing devices that had received the first key during transmission over the peer-to-peer network. In one case, when the content is accessed/decrypted, the first key may be deleted after a period of time of accessing/decrypting the content. In another case, when the content is accessed/decrypted, the first key may be deleted when a user manually deletes the content after accessing/decrypting the content. When all copies of the first key get deleted, the content becomes unrecoverable. In this regard, deleting all copies of the first key after the content has been accessed or after the lifespan of the first key has expired facilitates the secure exchange of content. If the lifespan of the first key has not expired and the content has not been decrypted flow branches NO and returns to operation 408.

Figure 5:
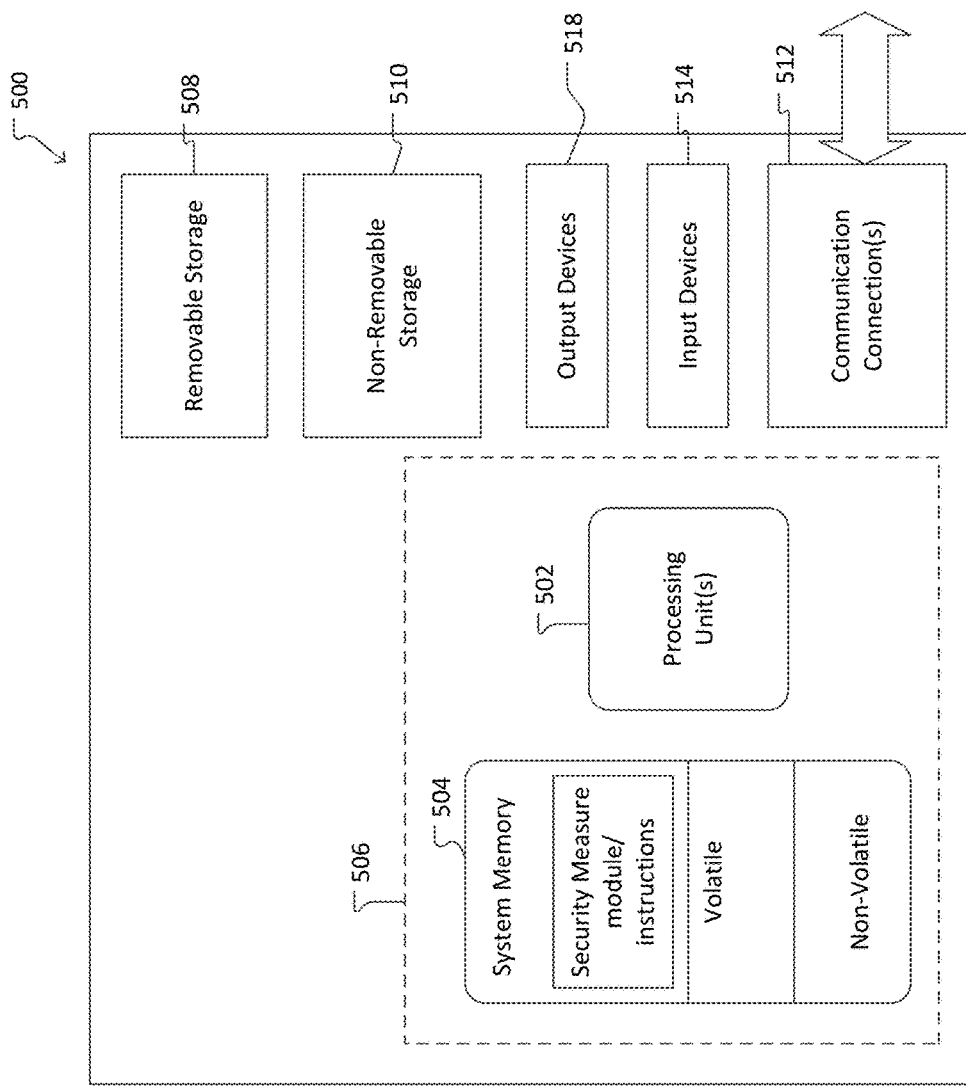
FIG. 5 illustrates one example of a suitable computing environment in which one or more of the embodiments of the present disclosure may be implemented.

FIG. 5 and the additional discussion in the present specification are intended to provide a brief general description of a suitable computing environment in which the present disclosure and/or portions thereof may be implemented. Although not required, the embodiments described herein may be implemented as computer-executable instructions, such as by program modules, being executed by a computer, such as a client workstation or a server. Generally, program modules include routines, programs, objects, components, data structures and the like that perform particular tasks or implement particular abstract data types. Moreover, it should be appreciated that the disclosure and/or portions thereof may be practiced with other computer system configurations, including hand-held devices, multiprocessor systems, microprocessor-based or programmable consumer electronics, network PCs, minicomputers, mainframe computers and the like. The disclosure may also be practiced in distributed computing environments where tasks are performed by remote processing devices that are linked through a communications network. In a distributed computing environment, program modules may be located in both local and remote memory storage devices.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, security measure component(s) and/or other components or instructions to implement or perform the system and methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Embodiments of the present disclosure are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments and/or one or more details or features described herein and provided in this application are not intended to limit or restrict the scope of the present disclosure as claimed in any way. The embodiments, examples, and details provided in this application are considered sufficient to convey possession and enable others to make and use the best mode of the claimed embodiments. The claimed embodiments should not be construed as being limited to any embodiment, example, or detail provided in this application. Regardless of whether shown and described in combination or separately, the various features (both structural and methodological) are intended to be selectively included or omitted to produce an embodiment with a particular set of features. Furthermore, embodiments according to the present disclosure may combine elements or components that are disclosed in general but not expressly exemplified in combination unless otherwise stated herein. It is therefore intended to cover in the appended claims all such changes and modifications that are within the scope of the invention. As such, having been provided with the description and illustration of the present application, one skilled in the art may envision variations, modifications, and alternate embodiments falling within the spirit of the broader aspects of the general inventive concept embodied in this application that do not depart from the broader scope of the claimed embodiments.

Finally, although specific aspects were described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method of exchanging keys within a peer-to-peer network, the method comprising:
    generating a first key, at a first computing device, for encrypting and decrypting content that is communicated between the first computing device and at least a second computing device, wherein the first key is generated using a stream of bits;
    assigning a security measure value to the first key, wherein the security measure value indicates a level of security associated with transmitting the first key over the peer-to-peer network;
    transmitting a copy of the first key over the peer-to-peer network to at least the second computing device;
    in response to transmitting the copy of the first key over the peer-to-peer network, updating the security measure value of the first key based on a first condition based on transmitting the copy of the first key over the peer-to-peer network, wherein the first condition is based on at least one of: a type of network over which the copy of the first key is transmitted, a type of method used to transmit the copy of the first key, a type of computing device that generated the first key, or a time stamp associated with the first key;

generating, at the first computing device, encrypted content using the first key based at least upon a desired security measure value of the first key; and sending the encrypted content over a network to the second computing device; and after a second condition based on expiring the copy of the first key has been satisfied, deleting the copy of the first key.

2. The method of claim 1, wherein the first key is used to decrypt the encrypted content at the second device.

3. The method of claim 2, wherein the first key is deleted when the content is accessed at the at least second computing device.

4. The method of claim 2, wherein the first key is deleted upon the expiration of a period of time.

5. The method of claim 1, wherein a maximum value for the desired security measure value indicates a highest level of security.

6. The method of claim 1, wherein a minimum value for the desired security measure value indicates a lowest level of security.

7. The method of claim 1, wherein the first key comprises an infinite stream of bits.

8. The method of claim 1, further comprising:
transmitting a second key over the peer-to-peer network to at least a third computing device; and
updating the security measure value of the second key based on a third at least one condition associated with transmitting the second key over the peer-to-peer network.

9. The method of claim 1, wherein the copy of the first key is deleted when the content is accessed on the second computing device.

10. The method of claim 1, wherein the second condition is specified by a user sending the encrypted content to the second computing device.

11. A non-transitory computer storage medium encoding computer executable instructions that, when executed by at least one processor, perform a method for exchanging keys within a peer-to-peer network, the method comprising:
generating a first key, at a first computing device, for encrypting and decrypting content that is communicated between the first computing device and at least a second computing device, wherein the first key is generated using a stream of bits;
assigning a security measure value to the first key, wherein the security measure value indicates a level of security associated with transmitting the first key over the peer-to-peer network;
transmitting a copy of the first key over the peer-to-peer network to at least the second computing device;
in response to transmitting the copy of the first key over the peer-to-peer network, updating the security measure value of the first key based on a first condition based on transmitting the copy of the first key over the peer-to-peer network, wherein the first condition is based on at least one of: a type of network over which the copy of the first key is transmitted, a type of method used to transmit the copy of the first key, a type of computing device that generated the first key, or a time stamp associated with the first key generating, at the first computing device, encrypted content using the first key based at least upon a desired security measure value of the first key;

sending the encrypted content over a network to the second computing device, and after a second condition based on expiring the copy of the first key has been satisfied, deleting the copy of the first key.

12. The non-transitory computer storage medium of claim 11, wherein the method further comprises generating encrypted content using the first key based on a desired security measure value of the first key.

13. The non-transitory computer storage medium of claim 12, wherein the method further comprises sending the encrypted content over a network to at least the second computing device.

14. The non-transitory computer storage medium of claim 13, wherein the method further comprises deleting the first key from the first computing device.

15. The non-transitory computer storage medium of claim 14, wherein the first key is used to decrypt the encrypted content at the second device.

16. The non-transitory computer readable medium of claim 11, wherein the method further comprises:
transmitting a second key of the one or more keys over the peer-to-peer network to at least a third computing device; and
updating the security measure value of the second key based on the first e condition associated with transmitting the second key over the peer-to-peer network.

17. The non-transitory computer readable medium of claim 11, wherein a maximum value for the security measure value indicates a highest level of security, and wherein a minimum value for the security measure value indicates a lowest level of security.

18. A system comprising:
at least one processor; and
memory encoding computer executable instructions that, when executed by the at least one processor, perform a method for exchanging keys within a peer-to-peer network, the method comprising:
generating a first key, at a first computing device, for encrypting and decrypting content that is communicated between the first computing device and at least a second computing device, wherein the first key is generated using a stream of bits;
assigning a security measure value to the first key, wherein the security value measure indicates a level of security associated with transmitting the first key over the peer-to-peer network;
transmitting a copy of the first key over the peer-to-peer network to at least the second computing device;
in response to transmitting the copy of the first key over the peer-to-peer network, updating the security measure value of the first key based on a first condition based on transmitting the first key over the peer-to-peer network, wherein the first condition is based on at least one of: a type of network over which the copy of the first key is transmitted, a type of method used to transmit the copy of the first key, a type of computing device that generated the first key, or a time stamp associated with the first key;
generating, at the first computing device, encrypted content using the first key based on a desired security measure value of the first key;
sending the encrypted content over a network to at least the second computing device; and after a second condition based on expiring the copy of the first key has been satisfied, deleting the copy of the first key.

19. The system of claim 18, wherein the copy of the first key is deleted from the second computing device when the content is accessed at the second computing device.

20. The system of claim 18, wherein the copy of the first key is deleted from the second computing device when a period of time has expired.

* * * * *